(12) United States Patent
Sakamoto

(10) Patent No.: US 9,517,526 B2
(45) Date of Patent: *Dec. 13, 2016

(54) SPOT WELDING APPARATUS AND SPOT WELDING METHOD

(75) Inventor: Noboru Sakamoto, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 437 days.

This patent is subject to a terminal disclaimer.

(21) Appl. No.: 13/423,023

(22) Filed: Mar. 16, 2012

(65) Prior Publication Data

US 2012/0241416 A1  Sep. 27, 2012

(30) Foreign Application Priority Data

Mar. 24, 2011 (JP) ................................ 2011-065355

(51) Int. Cl.
*B23K 11/10* (2006.01)
*B23K 9/28* (2006.01)
(Continued)

(52) U.S. Cl.
CPC ............ *B23K 11/115* (2013.01); *B23K 11/315* (2013.01); *B23K 2201/006* (2013.01); *B23K 2201/185* (2013.01)

(58) Field of Classification Search
CPC .... B23K 11/0033; B23K 11/11; B23K 11/115; B23K 11/10; B23K 11/318; B23K 11/314; B23K 11/312; B23K 11/31
(Continued)

(56) References Cited

U.S. PATENT DOCUMENTS

| 1,259,271 A | 3/1918 | Murray |
| 3,427,424 A | 2/1969 | Kirchberger et al. |

(Continued)

FOREIGN PATENT DOCUMENTS

| FR | WO 2006054023 A1 * | 5/2006 | ........... B23K 11/115 |
| JP | 58107283 A * | 6/1983 | |

(Continued)

OTHER PUBLICATIONS

US Office Action dated Mar. 13, 2014, in U.S. Appl. No. 13,137,600.

(Continued)

*Primary Examiner* — Tu B Hoang
*Assistant Examiner* — Alba Rosario-Aponte
(74) *Attorney, Agent, or Firm* — McGinn IP Law Group, PLLC

(57) ABSTRACT

There are provided a spot welding apparatus and a spot welding method. A workpiece is clamped between a combination of a second welding electrode and a receiving unit that abut against a thinner plate, and a first welding electrode that abuts against a second thicker plate, a pressure is applied to the workpiece by the first welding electrode, and a current is passed between the welding electrodes. Consequently, a satisfactory nugget is formed over from the thinner plate to the second thicker plate. Similarly, a workpiece is clamped between a combination of the first welding electrode and the receiving unit that abut against a thinner plate, and the second welding electrode that abuts against a second thicker plate, a pressure is applied to the workpiece by the second welding electrode. Consequently, a satisfactory nugget is formed over from the thinner plate to the second thicker plate.

10 Claims, 12 Drawing Sheets

(51) Int. Cl.
*B23K 11/11* (2006.01)
*B23K 11/31* (2006.01)

(58) Field of Classification Search
USPC .............. 219/86.33, 78.01, 86.1, 86.25, 86.41,219/86.61, 91.23, 91.2
See application file for complete search history.

(56) References Cited

U.S. PATENT DOCUMENTS

| | | | |
|---|---|---|---|
| 4,130,750 A | 12/1978 | Bennett et al. | |
| 4,480,170 A | 10/1984 | Kondou et al. | |
| 5,866,868 A * | 2/1999 | Hirane | 219/110 |
| 5,895,584 A | 4/1999 | Sakota | |
| 6,294,753 B1 * | 9/2001 | Fujii et al. | 219/110 |
| 7,588,223 B2 | 9/2009 | Wolvin | |
| 7,891,618 B2 | 2/2011 | Carnevali | |
| 8,334,474 B1 | 12/2012 | Oatridge et al. | |
| 8,993,918 B2 * | 3/2015 | Sakai | B23K 11/115 219/161 |
| 2005/0029233 A1 * | 2/2005 | Schuhen | 219/86.22 |
| 2010/0243616 A1 * | 9/2010 | Goto | B23K 11/0026 219/117.1 |
| 2011/0180516 A1 * | 7/2011 | Takahashi et al. | 219/86.41 |
| 2012/0126780 A1 * | 5/2012 | Watanabe et al. | 324/71.1 |
| 2013/0037525 A1 * | 2/2013 | Tanaka | 219/86.33 |

FOREIGN PATENT DOCUMENTS

| | | | |
|---|---|---|---|
| JP | 2003-251468 A | 9/2003 | |
| JP | 2003-251469 A | 9/2003 | |
| JP | WO 2010140605 A1 * | 12/2010 | B23K 11/115 |
| WO | WO 2006054023 A1 * | 5/2006 | B23K 11/11 |
| WO | WO 2010140605 A1 * | 12/2010 | |

OTHER PUBLICATIONS

United States Notice of Allowance dated Nov. 26, 2014 in U.S. Appl. No. 13/137,600.

* cited by examiner

FU=FL+Fα
FL<FU

FL = FU + Fα
FU < FL

Related Art

SPOT WELDING APPARATUS AND SPOT WELDING METHOD

CROSS-REFERENCE TO RELATED APPLICATION

The present application claims priority from Japanese Patent Application No. 2011-065355 filed on Mar. 24, 2011, the entire contents of which are hereby incorporated by reference.

BACKGROUND OF THE INVENTION

1. Field of the Invention

The present invention relates to apparatuses and methods for spot welding a plate workpiece in which a thicker plate and a thinner plate having different rigidities are stacked one on top of the other.

2. Description of the Related Art

In the art of joining stacked plates such as steel plates, spot welding has been widely used in which the plates are clamped between a pair of welding electrodes and a large current is passed between the electrodes for a predetermined time period while applying a welding pressure to the plates in order to heat the joint zone to substantially a melting temperature, thereby joining the plates together.

Provided that the welding pressure applied by the welding electrodes and the energization time in spot welding are constant, a nugget diameter gradually increases with an increase in current amperage. However, the application of an excessively large current increases the amount of generated heat, possibly resulting in a phenomenon called expulsion in which molten metal is expelled from between the plates. That is, expulsion is a phenomenon of molten metal exploding due to superheating at the joint zone and results in a nugget having defects such as holes and cracks. Such discontinuities in the nugget shape and the metal structure can be a factor that markedly decreases the joint strength as well as can be a factor reducing the plate thickness at the joint. On the other hand, the application of an excessively small current results in a small nugget that does not achieve sufficient joint strength. Further, when the welding pressure is low, the area of contact between the plates becomes small with the result that the current density is increased and expulsion is caused due to superheating. When the welding pressure is excessively high, the contact area at the joint becomes large and the current density is lowered with the result that the amount of generated heat is reduced. Consequently, the resultant nugget is small and does not achieve high weld strength.

Reference is now made to FIG. 13A which illustrates spot welding of a workpiece 100 in which a thinner plate 101 having a low rigidity and a small thickness, and a first thicker plate 102 and a second thicker plate 103 having a larger thickness, namely, a higher rigidity than the thinner plate 101, are stacked on top of one another. As illustrated, the workpiece 100 is clamped by a movable electrode 111 and a fixed electrode 112 in a condition such that the plates are in intimate contact without any clearance between the thinner plate 101 and the first thicker plate 102 and between the first thicker plate 102 and the second thicker plate 103. Energization by a power supply 113 results in a substantially uniform current density throughout an energization path between the movable electrode 111 and the fixed electrode 112. As a result, a satisfactory nugget is formed in a region ranging from the thinner plate 101 to the second thicker plate 103, thereby achieving desired weld strength.

In actuality, however, the low-rigidity thinner plate 101 and the first thicker plate 102 are bent upward when the workpiece 100 is clamped and pressed by the movable electrode 111 and the fixed electrode 112, leaving clearances between the thinner plate 101 and the first thicker plate 102 and between the first thicker plate 102 and the second thicker plate 103.

In such a case, the area of contact between the movable electrode 111 and the thinner plate 101 is increased due to the deflection of the thinner plate 101, while the contact areas at the joints between the thinner plate 101 and the first thicker plate 102 and between the first thicker plate 102 and the second thicker plate 103 are reduced by the clearances.

As a result, the current density between the movable electrode 111 and the fixed electrode 112 becomes higher on the second thicker plate 103 side than on the thinner plate 101 side, and the amount of local heat generated between the first thicker plate 102 and the second thicker plate 103 is larger than that generated between the thinner plate 101 and the first thicker plate 102.

Consequently, a nugget 105 is formed first at the joint between the first thicker plate 102 and the second thicker plate 103 as illustrated in FIG. 13A, and the nugget 105 gradually grows so as to weld the thinner plate 101 and the first thicker plate 102 as illustrated in FIG. 13B. However, the amount of penetration through the first thicker plate 102 into the thinner plate 101 is small and the weld strength is unstable. Thus, there is a risk that the thinner plate 101 will become separated. Further, the weld quality is variable. In particular, this defect is more likely with an increase in thickness of the first thicker plate 102 and the second thicker plate 103 because it is more difficult for the nugget 105 to reach between the first thicker plate 102 and the thinner plate 101.

Another reason for the small penetration between the thinner plate 101 and the first thicker plate 102 and the consequent unstable weld strength is the fact that due to the small thickness of the thinner plate 101, heat is drawn into the movable electrode 111 when the movable electrode 111 is in contact with the thinner plate 101 with the result that the temperature on the thinner plate 101 side is not increased, thereby preventing the formation of the nugget 105.

An exemplary remedy for this problem is a spot welding method disclosed in Japanese Unexamined Patent Application Publication No. 2003-251469. According to this spot welding method, as illustrated in FIG. 14, a workpiece 100 in which a thinner plate 101, a first thicker plate 102 and a second thicker plate 103 are stacked on top of one another is spot welded in a manner such that the welding pressure (FU) of a movable electrode 125 located on the thinner plate 101 side is controlled to be smaller than the welding pressure (FL) of a fixed electrode 124 positioned on the second thicker plate 103 side, whereby the contact resistance at the joint between the thinner plate 101 and the first thicker plate 102 is increased while the contact resistance at the joint between the first thicker plate 102 and the second thicker plate 103 is decreased. In this manner, energization between the movable electrode 125 and the fixed electrode 124 results in an increased amount of heat generated at the joint between the thinner plate 101 and the first thicker plate 102. Thus, the weld strength between the thinner plate 101 and the first thicker plate 102 can be increased.

FIG. 15 illustrates a structure of a spot welding gun that is used in performing the above method. As illustrated, a spot welding apparatus 120 is mounted on a wrist 116 of a welding robot 115. The welding robot 115 is configured to spot weld the workpiece 100 while moving the spot welding gun 120 to each of the welding sites on the workpiece 100 that is supported by a clamper 118.

The spot welding gun 120 has a base unit 122 that is vertically movably supported by a linear guide 121 fixed to a gun-supporting bracket 117 that is attached to the wrist 116. The base unit 122 is fitted with a C-shaped yoke 123 that extends downward. The fixed electrode 124 is disposed on the lower tip of the C-shaped yoke 123.

A pressure actuator 126 such as a servomotor is mounted on the upper end of the base unit 122. The movable electrode 125 opposing the fixed electrode 124 is attached to the lower end of a rod 127 that is vertically movable by the pressure actuator 126. A servomotor 128 is mounted on the upper end of the gun-supporting bracket 117. The base unit 122 is movable vertically by a ball screw mechanism by driving of the servomotor 128.

In accordance with teaching data stored in a controller which is not shown, the welding pressure (FU) of the movable electrode 125 located on the thinner plate 101 side is controlled to be smaller than the welding pressure (FL) of the fixed electrode 124 (EU<FL).

In order to control the welding pressure (FU) of the movable electrode 125 to be smaller than the welding pressure (FL) of the fixed electrode 124 (FU<FL), the controller first actuates the servomotor 128 so as to lift the base unit 122 and bring the fixed electrode 124 into contact with the lower surface of the workpiece 100. At the same time, the controller actuates the pressure actuator 126 so as to lower the movable electrode 125 into contact with the upper surface of the workpiece 100. In this case, the welding pressure applied by the pressure actuator 126 acts evenly on the movable electrode 125 and the fixed electrode 124 via the base unit 122 and the C-shaped yoke 123.

Next, the base unit 122 is lifted by the servomotor 128. By lifting the base unit 122, the welding pressure (FL) of the fixed electrode 124 is increased in accordance with lifting of the base unit 122. As a result, the welding pressure (FU) of the movable electrode 125 becomes smaller than the welding pressure (FL) of the fixed electrode 124 (FU<FL).

Consequently, when a current is passed between the movable electrode 125 and the fixed electrode 124, a high current density is achieved at the joint between the thinner plate 101 and the first thicker plate 102 and the amount of heat generated at the joint is increased relative to the amount of heat generated at the joint between the first thicker plate 102 and the second thicker plate 103. Thus, a uniform and satisfactory nugget is formed in a region ranging from the thinner plate 101 to the second thicker plate 103, and high weld strength is ensured.

According to Japanese Unexamined Patent Application Publication No. 2003-251469, the spot welding gun 120 is moved to each of the welding sites on the workpiece 100 that is supported by the clamper 118; the fixed electrode 124 is caused to abut against the second thicker plate 103 of the workpiece 100 and the movable electrode 125 is caused to abut against the thinner plate 101; and the base unit 122 is lifted to control the welding pressure (FU) of the movable electrode 125 to be smaller than the welding pressure (FL) of the fixed electrode 124. In this manner, the current density between the thinner plate 101 and the first thicker plate 102 is relatively increased to ensure that an appropriate amount of heat is generated at the joint between the thinner plate 101 and the first thicker plate 102. Thus, the amount of penetration is increased and the weld strength is improved.

However, the clamper 118 that clamps the workpiece 100 is required to withstand a heavy load when the welding pressure (FU) of the movable electrode 125 is controlled to be smaller than the welding pressure (FL) of the fixed electrode 124 by moving the base unit 122 while the workpiece 100 that is clamped by the clamper 118 is pinched between the fixed electrode 124 and the movable electrode 125. In the case where the position of the clamping of the workpiece 100 by the clamper 118 is very far from the welding position, namely, the position of a welding site, the workpiece 100 is distorted and deformed, whereby variations in the welding pressure (FL) of the fixed electrode 124 and the welding pressure (FU) of the movable electrode 125 are caused. As a result, it is difficult to stably ensure an appropriate contact resistance between the thinner plate 101 and the first thicker plate 102 and between the first thicker plate 102 and the second thicker plate 103. Thus, there is a risk that the current density at the joints in the workpiece 100 will be nonuniform and the quality of the spot weld will be lowered. Further, in the above method, a spot welding gun that has an equalizing function between the robot wrist and the base unit to allow for movements utilizing a reactive force produced by the welding pressure cannot be adopted. Thus, usable spot welding guns are limited.

SUMMARY OF THE INVENTION

In view of the problems in the art described above, it is an object of the invention to provide a spot welding apparatus and a spot welding method whereby a workpiece in which a thicker plate and a thinner plate having differing rigidities are stacked one on top of the other can be spot welded with a stable weld quality.

To achieve the above object, an aspect of the invention provides a spot welding apparatus for spot welding a workpiece in which a thinner plate having a small thickness, and a first thicker plate and a second thicker plate that have a higher rigidity and a larger thickness than the thinner plate are sequentially stacked on top of one another, the apparatus including a base unit, a receiving unit supported by the base unit, and a first welding electrode and a second welding electrode that are supported by the base unit and are movable toward and away from each other in an opposing relationship. The workpiece is clamped between a combination of the second welding electrode that abuts against the thinner plate and the receiving unit that is adjacent to the second welding electrode and abuts against the thinner plate, and the first welding electrode that abuts against the second thicker plate, a pressure is applied to the workpiece by the first welding electrode simultaneously with the clamping, and a current is passed between the first welding electrode and the second welding electrode while the workpiece is clamped under pressure to spot weld the workpiece. The workpiece is clamped between a combination of the first welding electrode that abuts against the thinner plate and the receiving unit that is adjacent to the first welding electrode and abuts against the thinner plate, and the second welding electrode that abuts against the second thicker plate, a pressure is applied to the workpiece by the second welding electrode simultaneously with the clamping, and a current is passed between the first welding electrode and the second welding electrode while the workpiece is clamped under pressure to spot weld the workpiece.

According to the above apparatus, the workpiece is clamped between a combination of the second welding electrode and the receiving unit that abut against the thinner plate, and the first welding electrode which abuts against the second thicker plate, and a pressure is applied to the workpiece by the first welding electrode. The welding pressure from the first welding electrode is applied to the second thicker plate of the workpiece, and the welding pressure from the second welding electrode and that from the receiving unit are applied to the thinner plate with the result that the welding pressure of the second welding electrode located on the thinner plate side is smaller than the welding pressure of the first welding electrode positioned on the second thicker plate side. As a result, when a current is passed between the first welding electrode and the second welding electrode, the current density at the joint between the thinner plate and the first thicker plate is relatively increased, and a satisfactory nugget is formed in a region ranging from the thinner plate to the second thicker plate with uniform penetration. Similarly, the workpiece is clamped between a combination of the first welding electrode and the receiving unit that abut against the thinner plate, and the second welding electrode which abuts against the second thicker plate, and a pressure is applied to the workpiece by the second welding electrode. The welding pressure from the second welding electrode is applied to the second thicker plate of the workpiece, and the welding pressure from the first welding electrode and that from the receiving unit are applied to the thinner plate with the result that the welding pressure of the first welding electrode located on the thinner plate side is smaller than the welding pressure of the second welding electrode positioned on the second thicker plate side. As a result, when a current is passed between the first welding electrode and the second welding electrode, the current density at the joint between the thinner plate and the first thicker plate is relatively increased, and a satisfactory nugget is formed in a region ranging from the thinner plate to the second thicker plate with uniform penetration. Thus, the weld quality of the welded workpiece can be improved.

Further, the apparatus can continuously spot weld workpieces having a thinner plate, a first thicker plate and a second thicker plate in different arrangements without the need of greatly changing the posture of the welding apparatus. For example, a three-ply workpiece in which a thinner plate, a first thicker plate and a second thicker plate are sequentially stacked from the bottom, and a three-ply workpiece in which a thinner plate, a first thicker plate and a second thicker plate are sequentially stacked from the top can be spot welded continuously without greatly changing the posture of the welding apparatus.

To achieve the above object, another aspect of the invention provides a spot welding apparatus for spot welding a workpiece in which a thinner plate, and a first thicker plate and a second thicker plate having a higher rigidity than the thinner plate are sequentially stacked on top of one another, the apparatus including a base unit, a receiving unit supported by the base unit, a first welding electrode that is movable to any one of a retracted position, a first pressing position and a second pressing position by a first pressure actuator supported by the base unit, and a second welding electrode that is movable to any one of a retracted position, a first pressing position and a second pressing position in an opposing relationship with the first welding electrode by a second pressure actuator supported by the base unit. The workpiece is clamped between a combination of the second welding electrode that is positioned at the first pressing position and the receiving unit that is adjacent to the second welding electrode and abuts against the thinner plate, and the first welding electrode that is positioned at the first pressing position, a pressure is applied to the workpiece by the first welding electrode simultaneously with the clamping, and a current is passed between the first welding electrode and the second welding electrode while the workpiece is clamped under pressure to spot weld the workpiece. The workpiece is clamped between a combination of the first welding electrode that is positioned at the second pressing position and the receiving unit that is adjacent to the first welding electrode and abuts against the thinner plate, and the second welding electrode that is positioned at the second pressing position, a pressure is applied to the workpiece by the second welding electrode simultaneously with the clamping, and a current is passed between the first welding electrode and the second welding electrode while the workpiece is clamped under pressure to spot weld the workpiece.

According to the above apparatus, the workpiece is clamped between a combination of the second welding electrode at the first pressing position and the receiving unit which abut against the thinner plate, and the first welding electrode at the first pressing position which abuts against the second thicker plate, and a pressure is applied to the workpiece by the first welding electrode at the first pressing position. The welding pressure from the first welding electrode at the first pressing position is applied to the second thicker plate of the workpiece, and the welding pressure from the second welding electrode and that from the receiving unit are applied to the thinner plate with the result that the welding pressure of the second welding electrode located on the thinner plate side is smaller than the welding pressure of the first welding electrode positioned on the second thicker plate side. As a result, when a current is passed between the first welding electrode and the second welding electrode, the current density at the joint between the thinner plate and the first thicker plate is relatively increased, and a satisfactory nugget is formed in a region ranging from the thinner plate to the second thicker plate with uniform penetration. Similarly, the workpiece is clamped between a combination of the first welding electrode at the second pressing position and the receiving unit which abut against the thinner plate, and the second welding electrode at the second pressing position which abuts against the second thicker plate, and a pressure is applied to the workpiece by the second welding electrode at the second pressing position. The welding pressure from the second welding electrode is applied to the second thicker plate of the workpiece, and the welding pressure from the first welding electrode and that from the receiving unit are applied to the thinner plate with the result that the welding pressure of the first welding electrode located on the thinner plate side is smaller than the welding pressure of the second welding electrode positioned on the second thicker plate side. As a result, when a current is passed between the first welding electrode and the second welding electrode, the current density at the joint between the thinner plate and the first thicker plate is relatively increased, and a satisfactory nugget is formed in a region ranging from the thinner plate to the second thicker plate with uniform penetration. Thus, the weld quality of the welded workpiece can be improved.

To achieve the above object, another aspect of the invention provides a spot welding apparatus for spot welding a workpiece in which a plurality of thicker plates are stacked on top of one another and a thinner plate is stacked together with the thicker plates, the apparatus including a base unit, a receiving unit that is supported by the base unit and is to abut against the thinner plate, a first welding electrode that is movable relative to the receiving unit by a first pressure actuator supported by the base unit, and a second welding electrode that is movable relative to the receiving unit by a second pressure actuator supported by the base unit. The workpiece is clamped under pressure by the receiving unit, the first welding electrode and the second welding electrode, and a current is passed between the first welding electrode and the second welding electrode while the workpiece is clamped under pressure to spot weld the workpiece.

According to the above apparatus, the workpiece is clamped under pressure by the receiving unit that abuts against the thinner plate, the first welding electrode that can be moved by the first pressure actuator, and the second welding electrode that can be moved by the second pressure actuator, in a manner such that the welding pressure applied to a pair of the thinner plate and the adjacent thicker plate is smaller than the welding pressure applied to each pair of the thicker plates. As a result, when a current is passed between the first welding electrode and the second welding electrode, the current density at the joint between the thinner plate and the adjacent thicker plate is increased, and a satisfactory nugget is formed in a region ranging from the thinner plate to the thicker plates with uniform penetration. Thus, the weld quality of the welded workpiece can be improved.

To achieve the above object, another aspect of the invention provides a spot welding method for spot welding a workpiece in which a plurality of thicker plates are stacked on top of one another and a thinner plate is stacked together with the thicker plates, wherein the thinner plate is caused to abut against a receiving unit that is supported by a base unit and the workpiece is clamped under pressure between a first welding electrode that is movable by a first pressure actuator supported by the base unit and a second welding electrode that is movable by a second pressure actuator supported by the base unit, and a current is passed between the first welding electrode and the second welding electrode while the workpiece is clamped under pressure to spot weld the workpiece.

According to the above method, the workpiece is clamped under pressure by the receiving unit that abuts against the thinner plate, the first welding electrode that can be moved by the first pressure actuator, and the second welding electrode that can be moved by the second pressure actuator, in a manner such that the welding pressure applied to a pair of the thinner plate and the adjacent thicker plate is smaller than the welding pressure applied to each pair of the thicker plates. As a result, when a current is passed between the first welding electrode and the second welding electrode, the current density at the joint between the thinner plate and the adjacent thicker plate is increased, and a satisfactory nugget is formed in a region ranging from the thinner plate to the thicker plates with uniform penetration. Thus, the weld quality of the welded workpiece can be improved.

According to the invention, the workpiece is clamped between a combination of the second welding electrode and the receiving unit which abut against the thinner plate, and the first welding electrode which abuts against the second thicker plate, and a pressure is applied to the workpiece by the first welding electrode with the result that the welding pressure of the second welding electrode located on the thinner plate side is smaller than the welding pressure of the first welding electrode positioned on the second thicker plate side. As a result, when a current is passed between the first welding electrode and the second welding electrode, a satisfactory nugget is formed in a region ranging from the thinner plate to the second thicker plate with uniform penetration. Similarly, the workpiece is clamped between a combination of the first welding electrode and the receiving unit which abut against the thinner plate, and the second welding electrode which abuts against the second thicker plate, and a pressure is applied to the workpiece by the second welding electrode with the result that the welding pressure of the first welding electrode located on the thinner plate side is smaller than the welding pressure of the second welding electrode positioned on the second thicker plate side. As a result, when a current is passed between the first welding electrode and the second welding electrode, a satisfactory nugget is formed in a region ranging from the thinner plate to the second thicker plate with uniform penetration. Thus, the weld quality of the welded workpiece can be improved.

DESCRIPTION OF THE PREFERRED EMBODIMENT

An Embodiment of the present invention will be described hereinbelow with reference to FIGS. 1 to 12.

Figure 1:
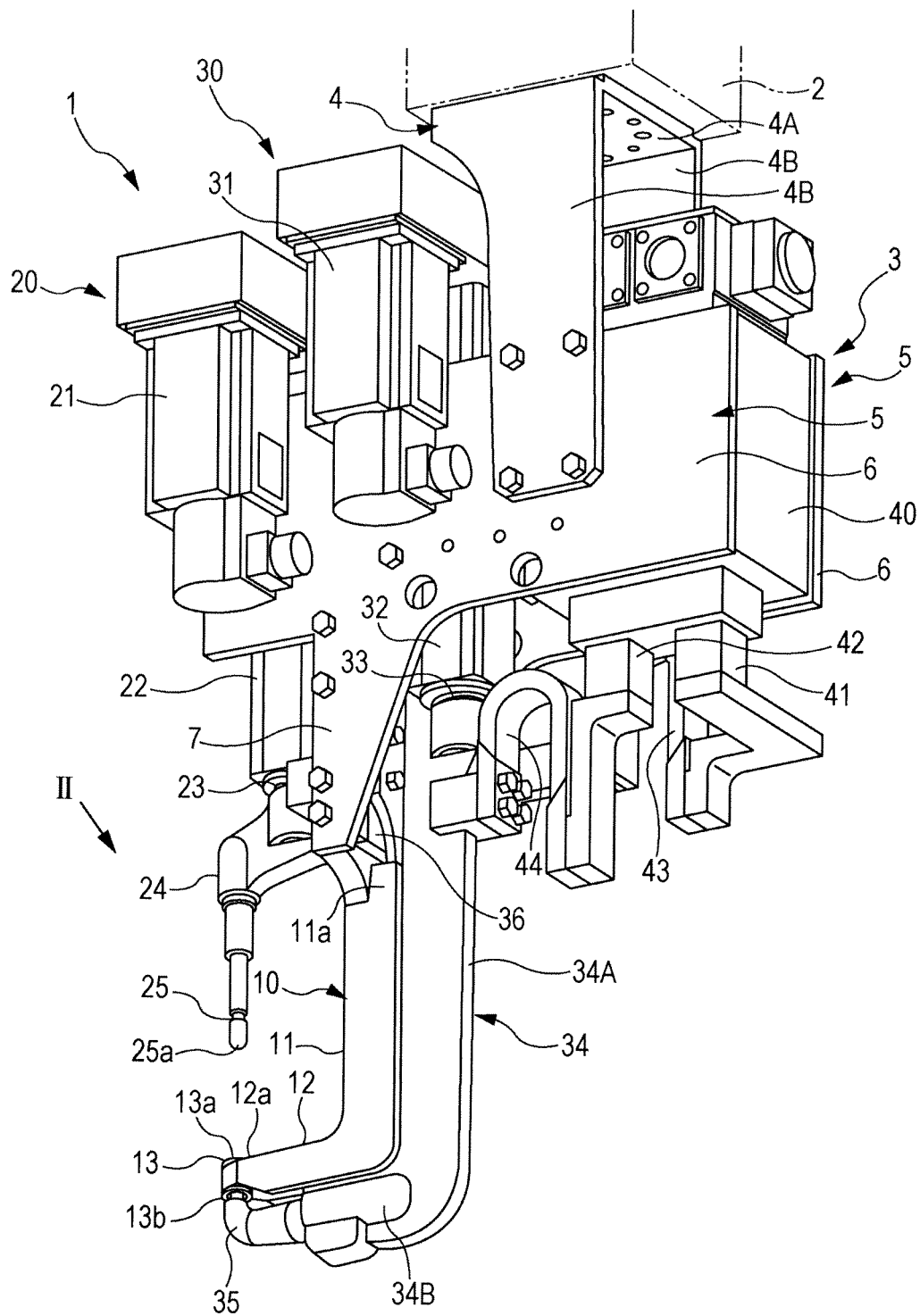
FIG. 1 is a view illustrating a structure of a spot welding apparatus according to an embodiment of the invention.
Figure 2:
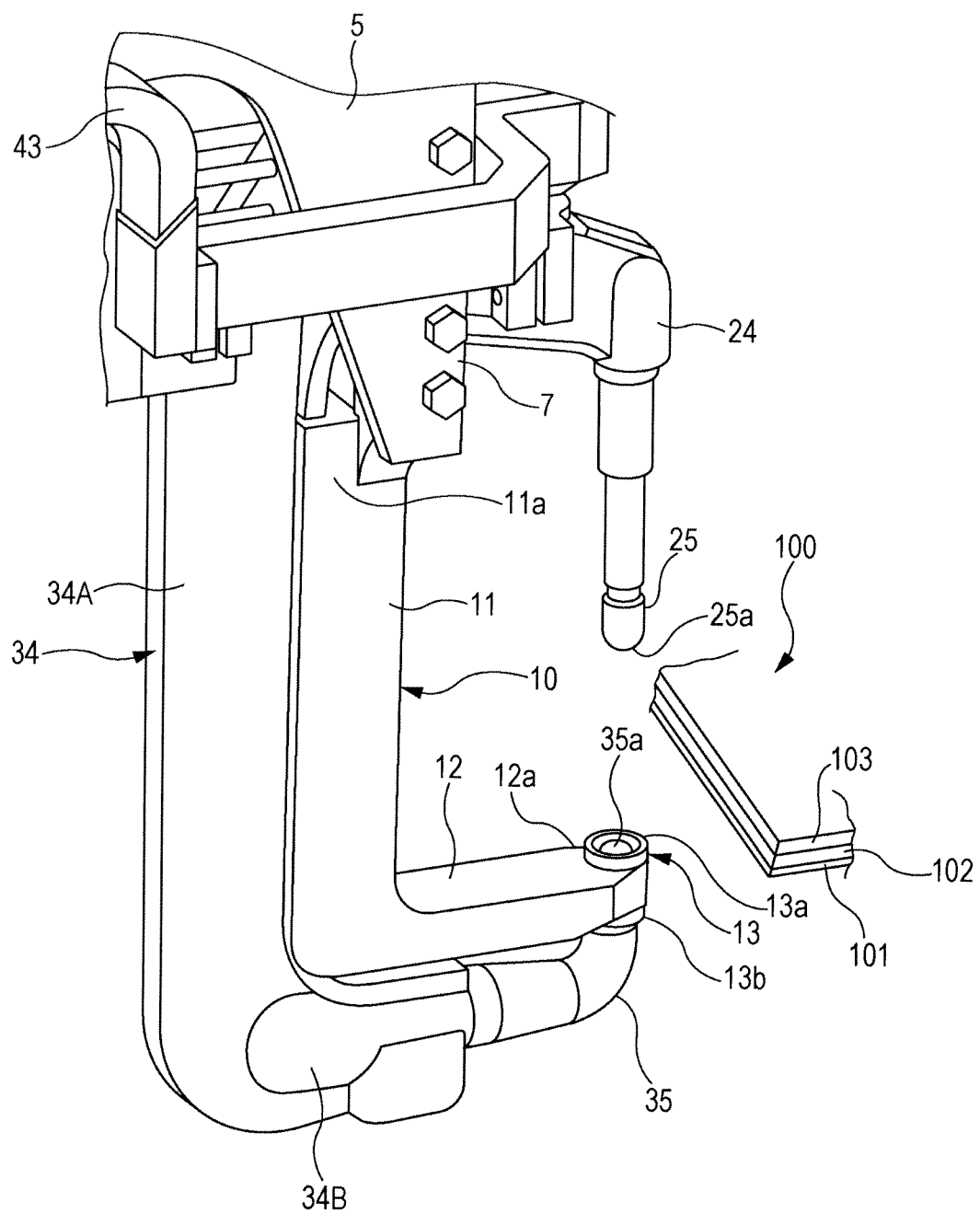
FIG. 2 is a view of a main section taken on arrow II in FIG. 1.

FIG. 1 is a view illustrating a structure of a spot welding apparatus, and FIG. 2 is a view of a main section taken along arrow II in FIG. 1. For convenience in the description of the spot welding apparatus, the upward direction and the downward direction in FIG. 1 will be referred to as the upward direction and the downward direction in the spot welding apparatus.

Prior to describing a spot welding apparatus 1, a workpiece 100 to be welded will be described with reference to FIG. 2. The workpiece 100 is a three-ply plate in which a thinner plate is stacked onto one of two thicker plates that have been stacked one on top of the other, for example, a three-ply plate in which a thinner plate 101 having a low rigidity and a small thickness, and a first thicker plate 102 and a second thicker plate 103 that have a larger thickness and a higher rigidity than the thinner plate 101 are sequentially stacked on top of one another.

As illustrated in FIGS. 1 and 2, the spot welding apparatus 1 is supported, via an equalizer unit 2, by a wrist that is attached to the tip of an arm of a welding robot such as a multi-joint robot, and can be moved three dimensionally by the welding robot. The welding robot moves the spot welding apparatus 1 sequentially to each of predetermined welding sites on the workpiece 100 that is held at a predetermined position by a member such as a clamper which is not shown, thereby spot welding the workpiece 100.

The spot welding apparatus 1 has a base unit 3. The base unit 3 is composed of an apparatus attachment bracket 4 that is attached to a wrist of the welding robot via the equalizer unit 2, and gun brackets 5 that are integrally attached to the apparatus attachment bracket 4. The apparatus attachment bracket 4 has a U-shaped cross section. This cross section includes an attachment base section 4A that is a rectangular flat plate connected to the equalizer unit 2, and a pair of opposing gun attachment sections 4B that are curved downward from both sides of the attachment base section 4A.

The gun brackets 5 are attached so as to oppose the respective gun attachment sections 4B of the apparatus attachment bracket 4. Each gun bracket 5 is a substantially T-shaped plate in which a bracket body 6 that is a rectangular plate extending in a direction and is attached to the gun attachment section 4B, and a fixing arm support section 7 that extends downward from the bracket body 6 are integrally formed.

A fixing arm 10, a first pressure actuator 20, a second pressure actuator 30 and a welding transformer 40 are attached to and supported by the opposing gun brackets 5.

The fixing arm 10 is a substantially L-shaped member that has a fixing arm body 11 of a substantially U-shaped cross section which extends downward as a result of a rear end section 11a being hung between and coupled to the ends of the fixing arm support sections 7 of the gun brackets 5, and further has a support section 12 which extends while curving from the tip of the fixing arm body 11. A receiving unit 13 is formed in a tip 12a of the support section 12. The receiving unit 13 defines a pipe that has a central axis extending in a vertical direction, and has an upper end 13a and a lower end 13b that project from the support section 12.

The first pressure actuator 20 has a cylinder device or a servomotor, in this embodiment a servomotor 21, and a direct driving unit 22 that is constituted by a ball screw mechanism or the like. A rod 23 of the direct driving unit 22 is raised or lowered by driving of the servomotor 21. A first electrode arm 24 is provided at the lower end of the rod 23 of the direct driving unit 22. A first welding electrode 25 is attached at the tip of the first electrode arm 24 so as to be in a coaxial relationship with the central axis of the receiving unit 13 of the fixing arm 10. According to this configuration, a top end 25a of the first welding electrode 25 can be moved by driving of the servomotor 21 of the first pressure actuator 20 among a retracted position at which the top end 25a is raised furthest upward from the upper end 13a of the receiving unit 13, a first pressing position at which the top end 25a clamps the workpiece 100 in cooperation with the upper end 13a of the receiving unit 13 and applies a welding pressure to the workpiece 100, and a second pressing position at which the top end 25a penetrates through the receiving unit 13 to reach the position of the lower end 13b of the receiving unit 13.

The second pressure actuator 30 has a cylinder device or a servomotor, in this embodiment a servomotor 31, and a direct driving unit 32 that is constituted by a ball screw mechanism or the like. A rod 33 of the direct driving unit 32 is raised or lowered by driving of the servomotor 31. At the lower end of the rod 33 of the direct driving unit 32, an L-shaped second electrode arm 34 is provided which has a linear base section 34A and a curved electrode holding section 34B formed at the lower end of the base section 34A. A second welding electrode 35 is attached at the electrode holding section 34B of the second electrode arm 34 such that a top end 35a of the second welding electrode 35 has a coaxial relationship with the central axis of the receiving unit 13 of the fixing arm 10. Further, an electrode arm slide member 36 is provided at the fixing arm support section 7 of the gun bracket 5. The electrode arm slide member 36 guides the movement of the second electrode arm 34 by being in slidable contact with the base section 34A of the second electrode arm 34.

According to this configuration, the second welding electrode 35 can be moved by driving of the servomotor 31 of the second pressure actuator 30 among a retracted position at which the second welding electrode 35 is lowered furthest downward from the lower end 13b of the receiving unit 13, a second pressing position at which the second welding electrode 35 clamps the workpiece 100 in cooperation with the lower end 13b of the receiving unit 13 and the first welding electrode 25 at the second pressing position, and applies a welding pressure to the workpiece 100, and a first pressing position at which the second welding electrode 35 penetrates through the receiving unit 13 to reach the position of the upper end 13a of the receiving unit 13 and clamps the workpiece 100 in combination with the upper end 13a of the receiving unit 13 and in cooperation with the first welding electrode 25 at the first pressing position.

An output terminal 41 of the welding transformer 40 serving as a power supply is conductively connected to the first welding electrode 25 via, for example, a busbar 43 and the first electrode arm 24. An output terminal 42 of the welding transformer 40 is conductively connected to the second welding electrode 35 via, for example, a busbar 44 and the second electrode arm 34.

A welding robot controller RC, which is not shown, stores teaching data for the welding robot. The teaching data include operation programs for sequentially spot welding the welding sites on the workpiece 100, as well as data indicating the position and posture of the spot welding apparatus 1 at each of the welding sites, namely, the welding zones. A welding apparatus controller WC, which is not shown, stores operation programs for the welding apparatus 1, as well as data for controlling the operations of the first pressure actuator 20, the second pressure actuator 30 and the welding transformer 40.

Next, operations of the spot welding apparatus 1 will be described. For convenience, a first welding step will be described with reference to FIGS. 3 to 7 which illustrate spot welding of a workpiece 100 that is a three-ply plate in which a thinner plate 101, a first thicker plate 102 and a second thicker plate 103 are stacked on top of one another in this order from the bottom, and a second welding step will be described thereafter with reference to FIGS. 8 to 12 which illustrate spot welding of a workpiece 100 that is a three-ply plate in which a thinner plate 101, a first thicker plate 102 and a second thicker plate 103 are stacked on top of one another in this order from the top.

In the first welding step in which a workpiece 100 including a thinner plate 101, a first thicker plate 102 and a second thicker plate 103 that are stacked on top of one another in this order from the bottom is spot welded, a previously determined operation program is conducted whereby the first welding electrode 25 is held at the furthest upward position, namely, the retracted position, and the rotation of the servomotor 31 of the second pressure actuator 30 is controlled so as to move the second welding electrode 35 to the first pressing position at which the top end 35a of the second welding electrode 35 is at the same level as the upper end 13a of the receiving unit 13.

Figure 3:
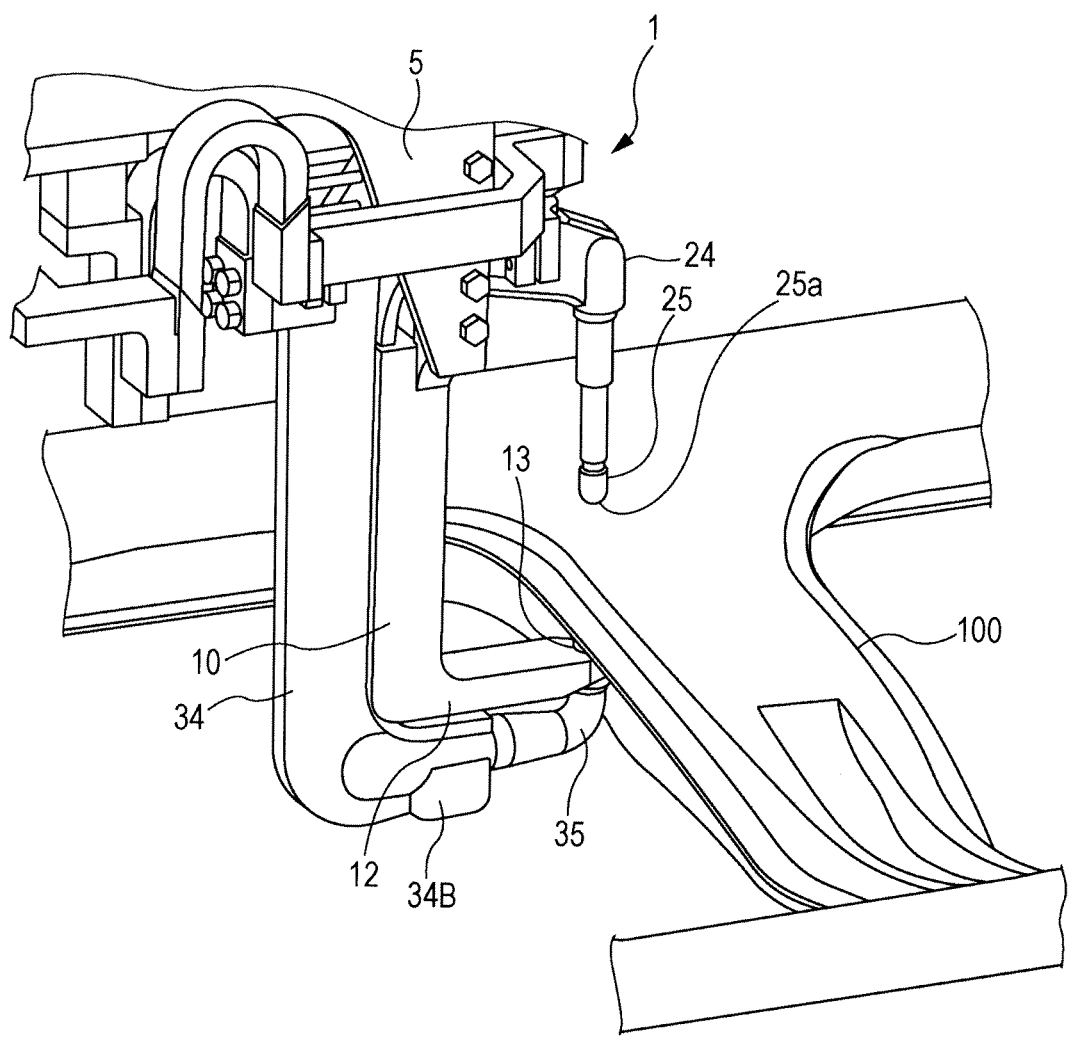
FIG. 3 is an explanatory view for an operation of a spot welding apparatus.
Figure 4:
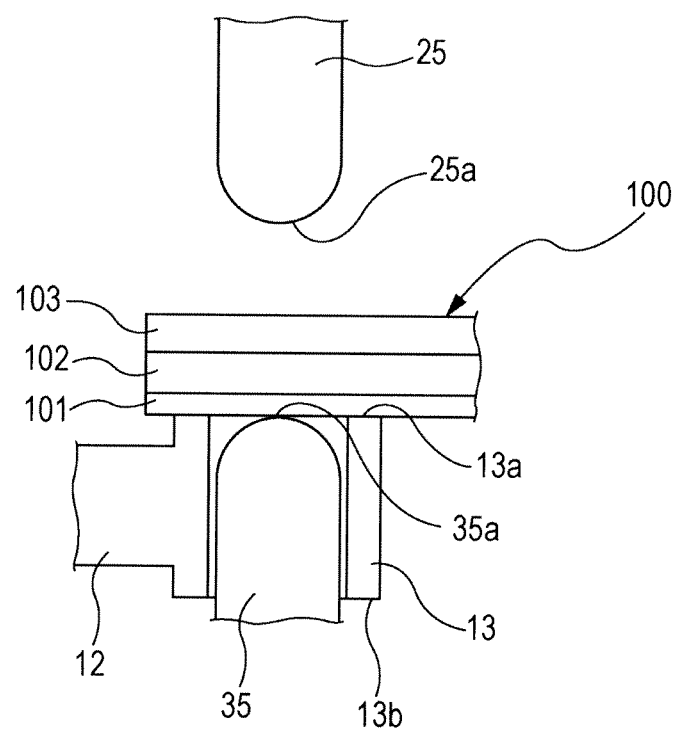
FIG. 4 is a sectional explanatory view for an operation of a main section in FIG. 3.

In this state in which the first welding electrode 25 and the second welding electrode 35 are distant from each other, namely, the first welding electrode 25 is at the retracted position and the second welding electrode 35 is at the first pressing position, the welding robot controller RC operates the welding robot in accordance with the predetermined program whereby the spot welding apparatus 1 is moved to a welding site on the workpiece 100 such that the upper end 13a of the receiving unit 13 in the fixing arm 10 and the top end 35a of the second welding electrode 35 are positioned in an abutting relationship with the lower surface of the workpiece 100, namely, the thinner plate 101, as illustrated in FIG. 3.

In this state in which the spot welding apparatus 1 has been positioned at the welding position, as illustrated in FIG. 1, the lower surface of the thinner plate 101 of the workpiece 100 is in contact with the top end 35a of the second welding electrode 35 and the upper end 13a of the receiving unit 13 that defines a ring in the vicinity of the top end 35a of the second welding electrode 35. On the other hand, the tip end 25a of the first welding electrode 25 opposes the second thicker plate 103 with a space therebetween.

Figure 5:
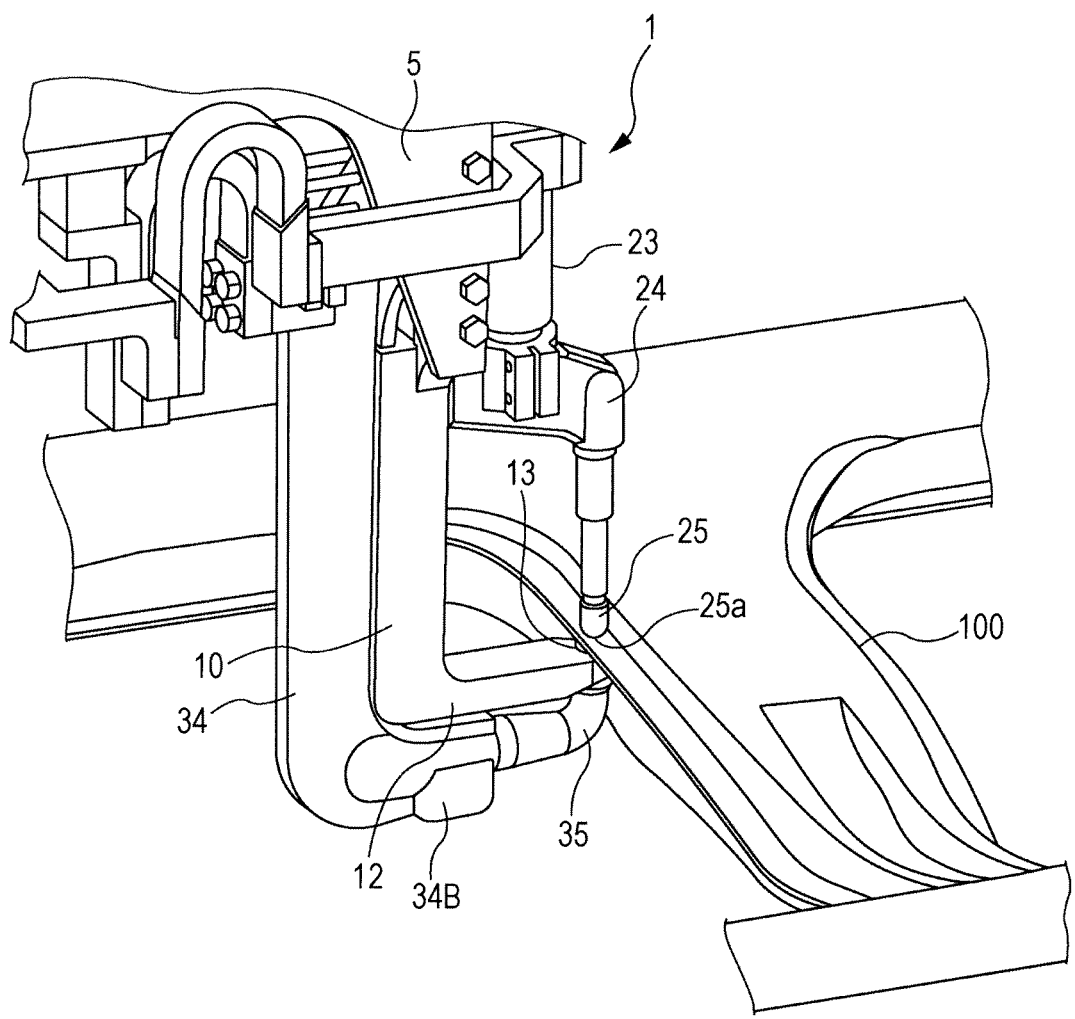
FIG. 5 is an explanatory view for an operation of the spot welding apparatus.
Figure 6:
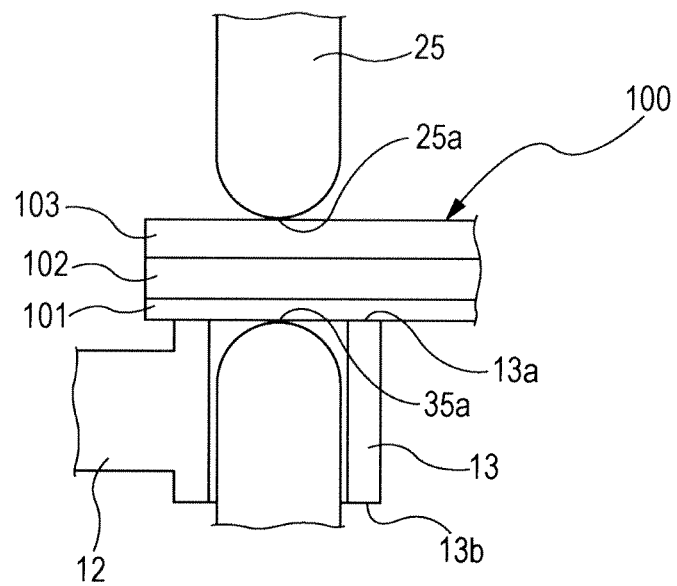
FIG. 6 is a sectional explanatory view for an operation of a main section in FIG. 5.
Figure 7:
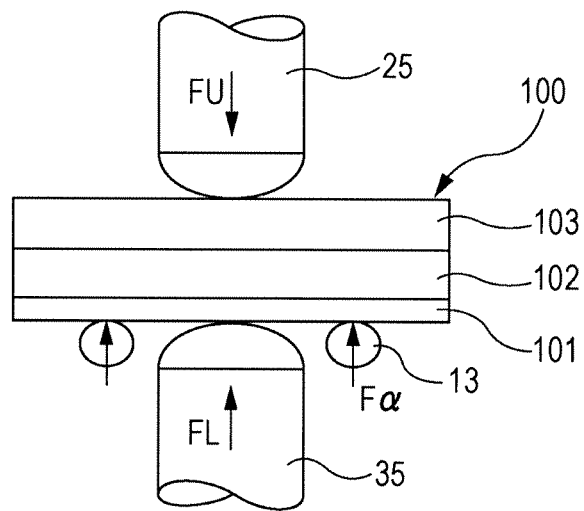
FIG. 7 is a schematic explanatory view for an operation of the spot welding apparatus.

Next, as illustrated in FIGS. 5 to 7, while the upper end 13a of the receiving unit 13 and the top end 35a of the second welding electrode 35 are in an abutting relationship with the thinner plate 101 of the workpiece 100, the servomotor 21 of the first pressure actuator 20 is driven whereby the first welding electrode 25 is moved from the retracted position toward the first pressing position so as to be in pressed contact with the second thicker plate 103. In this manner, the welding zone of the workpiece 100 is clamped under pressure between the top end 35a of the second welding electrode 35 and the top end 25a of the first welding electrode 25.

In the above state in which the first welding electrode 25 applies a welding pressure to the second thicker plate 103 while the top end 35a of the second welding electrode 35 and the upper end 13a of the receiving unit 13 are in an abutting relationship with the thinner plate 101 of the workpiece 100, the welding pressure from the first pressure actuator 20 is applied downward from the first welding electrode 25 to the second thicker plate 103 via, for example, the first electrode arm 24. Further, the welding pressure is applied upward from the second welding electrode 35 to the thinner plate 101 via, for example, the base unit 3 and the second electrode arm 34, and is also applied upward from the receiving unit 13 that is adjacent to the second welding electrode 35 to the thinner plate 101 via the fixing arm 10. This operation is schematically illustrated in FIG. 7.

In the above case, the welding pressure of the first pressure actuator 20 acts on the first welding electrode 25 via, for example, the first electrode arm 24, as well as on the second welding electrode 35 via, for example, the base unit 3 and the second electrode arm 34, and on the receiving unit 13 via the fixing arm 10. Here, the welding pressure FU applied to the second thicker plate 103 by the first welding electrode 25 is equal to the total of the welding pressure FL and the welding pressure Fα that are applied to the thinner plate 101 by the second welding electrode 35 and the receiving unit 13, respectively (FU=FL+Fα).

In the above manner, the workpiece 100 is clamped stably by the welding pressure FU that is applied downward to the second thicker plate 103 side by the first welding electrode 25, and the welding pressure FL and the welding pressure Fα that are applied upward to the thinner plate 101 side by the second welding electrode 35 and the receiving unit 13, respectively.

As described above, the welding pressure FU is applied to the second thicker plate 103 by the first welding electrode 25, and the welding pressure FL and the welding pressure Fα are applied to the thinner plate 101 by the second welding electrode 35 and the receiving unit 13, respectively. In the welding zone of the workpiece 100, the welding pressure FL that is applied to the thinner plate 101 by the second welding electrode 35 is of a quantity obtained by subtracting the welding pressure Fα by the receiving unit 13 from the welding pressure FU by the first welding electrode 25 (FL=FU−Fα).

As described above, the welding pressure FL of the second welding electrode 35 that is positioned on the thinner plate 101 side is controlled to be smaller than the welding pressure FU of the first welding electrode 25 that is positioned on the second thicker plate 103 side (FL<FU). As a result, the contact pressure at the joint between the thinner plate 101 and the first thicker plate 102 becomes smaller than the contact pressure at the joint between the first thicker plate 102 and the second thicker plate 103. Thus, the contact resistance between the thinner plate 101 and the first thicker plate 102 is relatively increased, and the contact resistance between the first thicker plate 102 and the second thicker plate 103 is relatively decreased.

Here, a case will be considered in which the receiving unit 13 of the fixing arm 10 is not provided. When the first pressure actuator 20 is operated to bring the first welding electrode 25 into pressed contact with the second thicker plate 103 while the second welding electrode 35 is in an abutting relationship with the thinner plate 101 of the workpiece 100, the welding zone of the workpiece 100 is clamped and pressed between the second welding electrode 35 and the first welding electrode 25. In this case, however, the welding pressure of the first pressure actuator 20 acts evenly on the first welding electrode 25 and the second welding electrode 35 via, for example, the second electrode arm 34. That is, the welding pressure FU that is applied to the second thicker plate 103 by the first welding electrode 25 is equal to the welding pressure FL that is applied to the thinner plate 101 by the second welding electrode 35.

Referring back to the embodiment described so far, the first welding electrode 25 and the second welding electrode 35 are then energized for a predetermined time by the welding transformer 40 to perform spot welding in the state in which the workpiece 100 is clamped under pressure by the first welding electrode 25 and a combination of the second welding electrode 35 and the receiving unit 13 in a manner such that the welding pressure FL of the second welding electrode 35 that is positioned on the thinner plate 101 side is smaller than the welding pressure FU of the first welding electrode 25 that is positioned on the second thicker plate 103 side. When the first welding electrode 25 and the second welding electrode 35 are being energized, the contact resistance and the current density at the joint between the thinner plate 101 and the first thicker plate 102 are relatively increased while the contact resistance between the first thicker plate 102 and the second thicker plate 103 is maintained low. As a result, the amount of heat generated at the joint between the thinner plate 101 and the first thicker plate 102 is relatively increased to the amount of heat generated at the joint between the first thicker plate 102 and the second thicker plate 103. Thus, a current flows with a uniform current density from the thinner plate 101 to the second thicker plate 103, and a satisfactory nugget is formed in a region ranging from the thinner plate 101 to the second thicker plate 103, thereby ensuring high weld strength of the thinner plate 101.

After the completion of the welding, the first pressure actuator 20 is operated so as to move the first welding electrode 25 from the first pressing position to the retracted position whereby the workpiece 100 is released from being clamped by the first welding electrode 25 and a combination of the second welding electrode 35 and the receiving unit 13.

Next, the second welding step will be described with reference to FIGS. 8 to 12. In this step, a workpiece 100 that is a three-ply plate in which a thinner plate 101, a first thicker plate 102 and a second thicker plate 103 are stacked on top of one another in this order from the top is spot welded.

In performing the spot welding of the workpiece 100 including the thinner plate 101, the first thicker plate 102 and the second thicker plate 103 that are stacked on top of one another in this order from the top, a previously determined operation program is conducted whereby the second welding electrode 35 is held at the furthest downward position, namely, the retracted position, and the rotation of the servomotor 21 of the first pressure actuator 20 is controlled so as to move the first welding electrode 25 to the second pressing position at which the top end 25a of the first welding electrode 25 is of the same level as the lower end 13b of the receiving unit 13.

Figure 8:
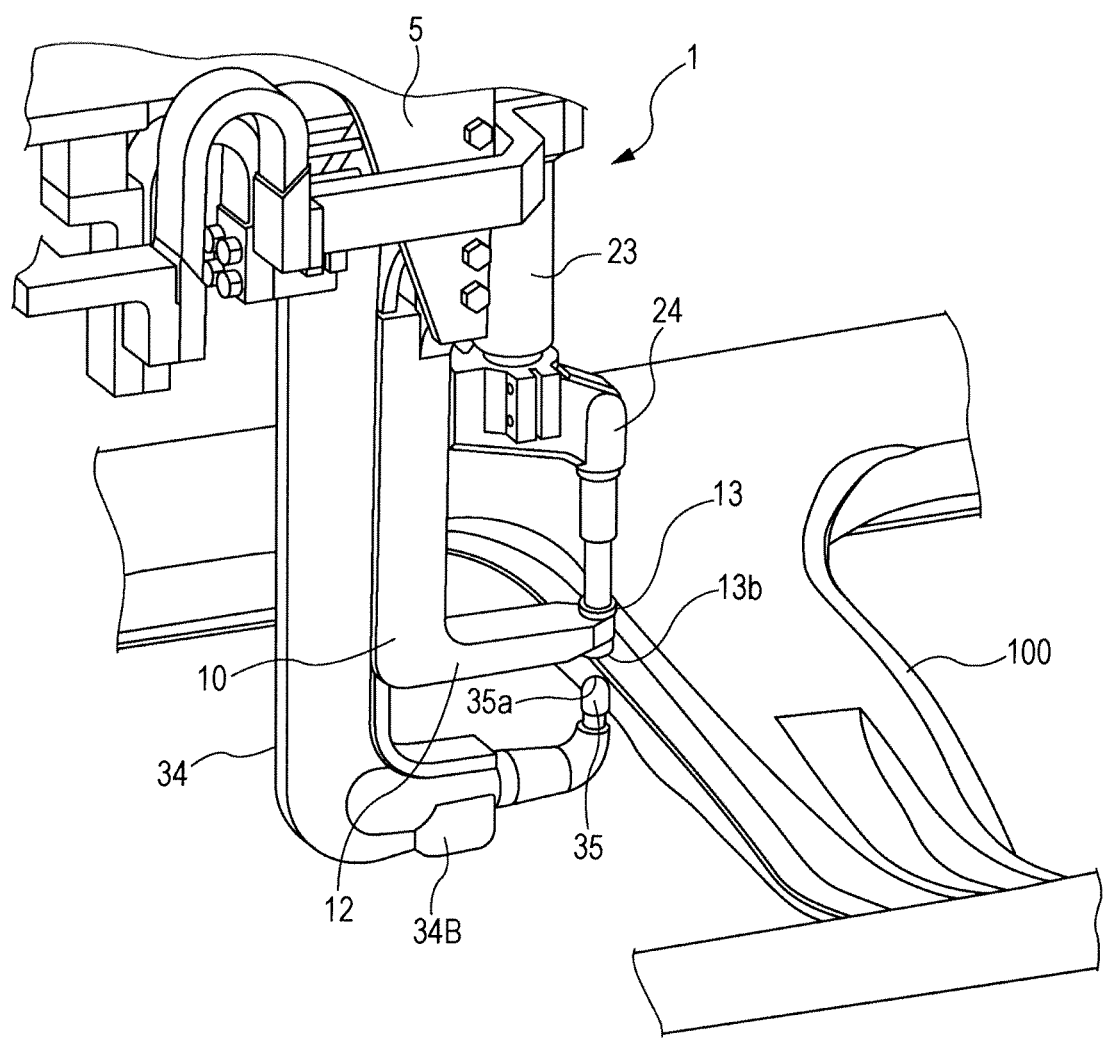
FIG. 8 is an explanatory view for an operation of the spot welding apparatus.

In this state in which the second welding electrode 35 and the first welding electrode 25 are distant from each other, namely, the second welding electrode 35 is at the retracted position and the first welding electrode 25 is at the second pressing position, the welding robot is operated in accordance with the predetermined program whereby the spot welding apparatus 1 is moved to a welding site on the workpiece 100 such that the lower end 13b of the receiving unit 13 in the fixing arm 10 and the top end 25a of the first welding electrode 25 are positioned in an abutting relationship with the upper surface of the workpiece 100, namely, the thinner plate 101, as illustrated in FIG. 8.

Figure 9:
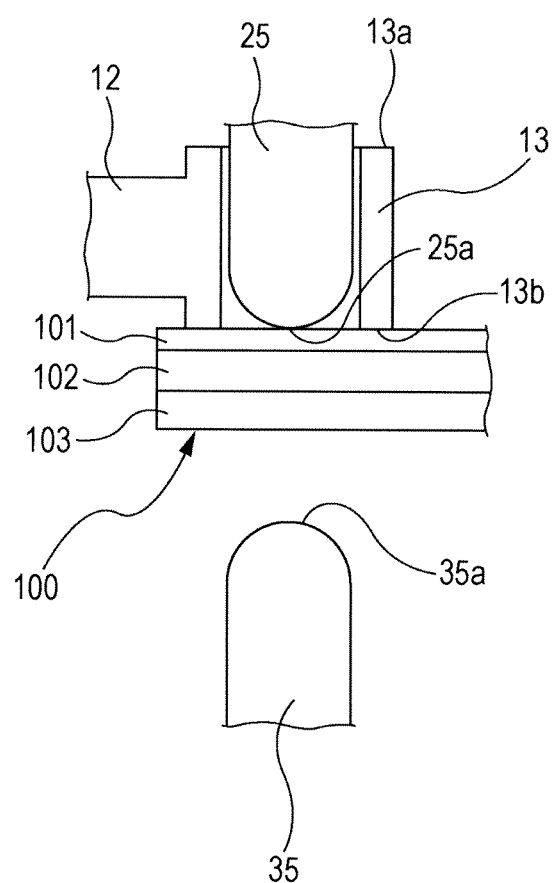
FIG. 9 is a sectional explanatory view for an operation of a main section in FIG. 8.

In this state in which the spot welding apparatus 1 has been positioned in the welding position, as illustrated in FIG. 9, the upper surface of the thinner plate 101 of the workpiece 100 is in contact with the top end 25a of the first welding electrode 25 and the lower end 13b of the receiving unit 13 that defines a ring in the vicinity of the top end 25a of the first welding electrode 25. On the other hand, the tip end 35a of the second welding electrode 35 opposes the second thicker plate 103 with a space therebetween.

Figure 10:
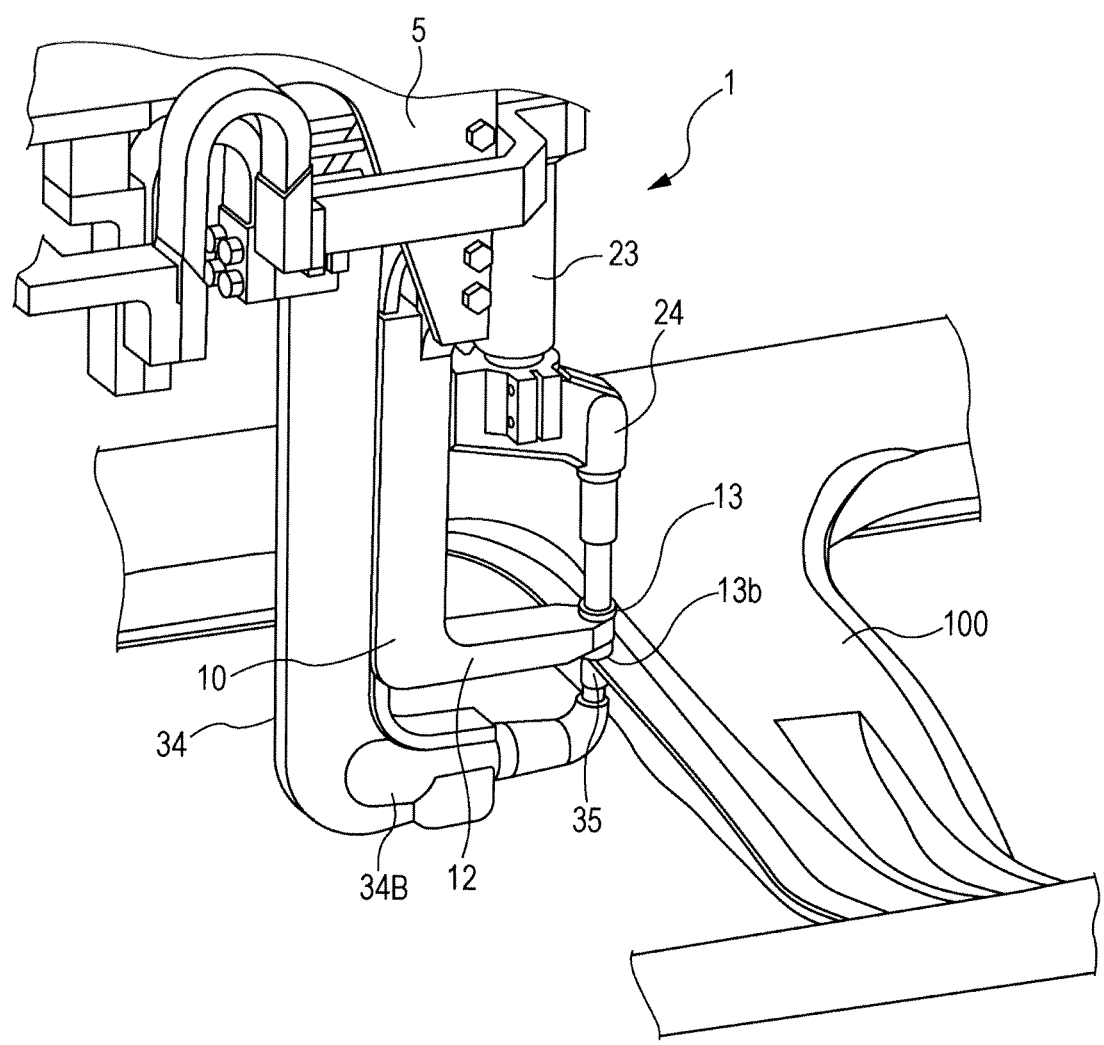
FIG. 10 is an explanatory view for an operation of the spot welding apparatus.
Figure 11:
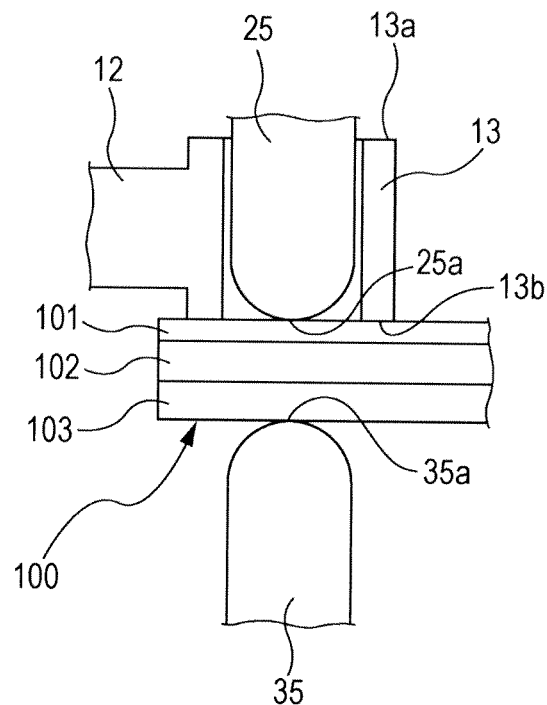
FIG. 11 is a sectional explanatory view for an operation of a main section in FIG. 10.

Next, as illustrated in FIGS. 10 and 11, while the lower end 13b of the receiving unit 13 and the top end 25a of the first welding electrode 25 are in an abutting relationship with the thinner plate 101 of the workpiece 100, the servomotor 31 of the second pressure actuator 30 is driven whereby the second welding electrode 35 is moved from the retracted position toward the second pressing position so as to be in pressed contact with the second thicker plate 103. In this manner, the welding zone of the workpiece 100 is clamped under pressure between the top end 25a of the first welding electrode 25 and the top end 35a of the second welding electrode 35.

Figure 12:
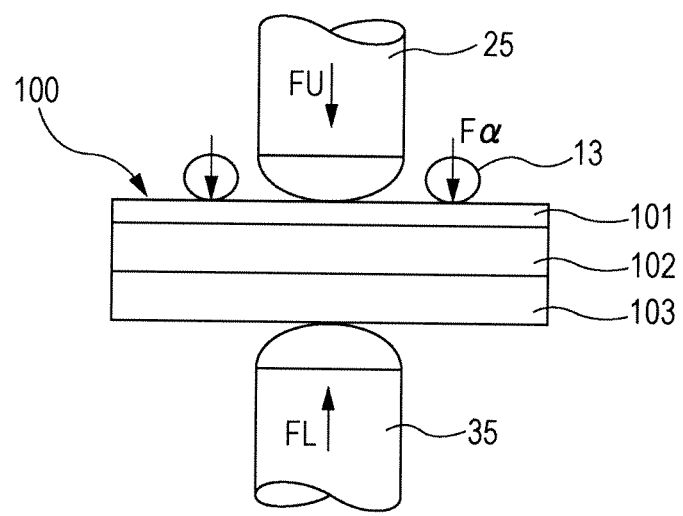
FIG. 12 is a schematic explanatory view for an operation of the spot welding apparatus.
Figure 13A:
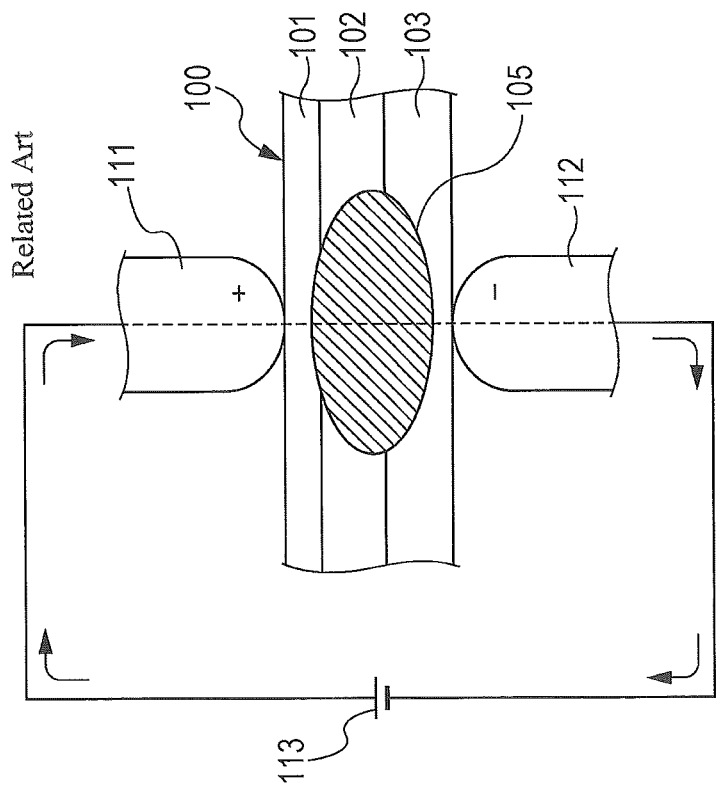
FIG. 13A is a view that briefly illustrates conventional spot welding.
Figure 13B:
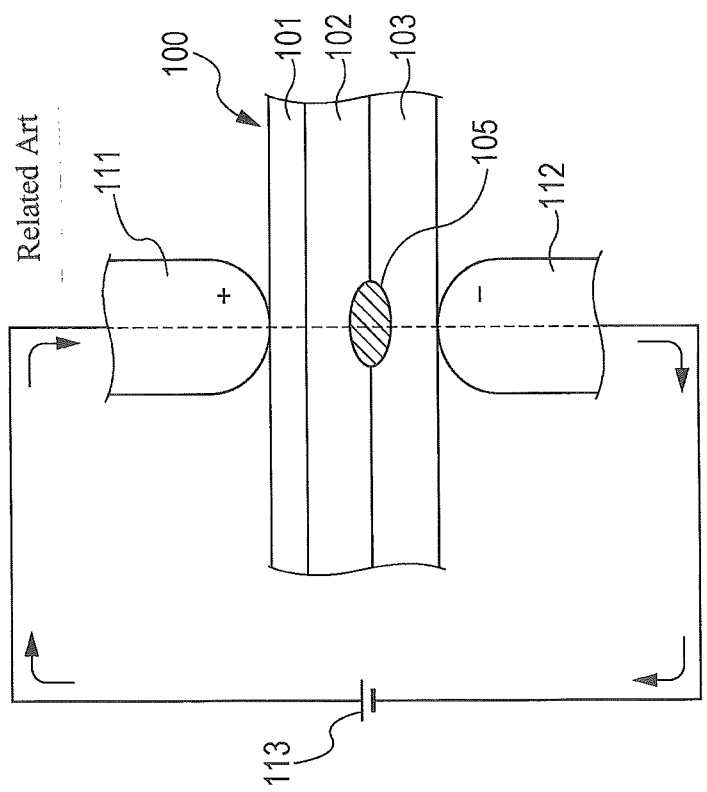
FIG. 13B is a view that briefly illustrates conventional spot welding.
Figure 14:
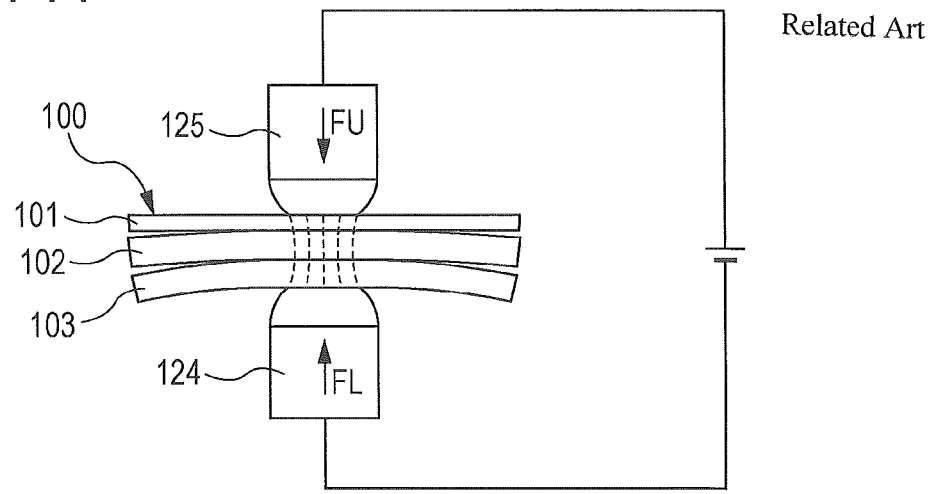
FIG. 14 is a view that briefly illustrates conventional spot welding.
Figure 15:
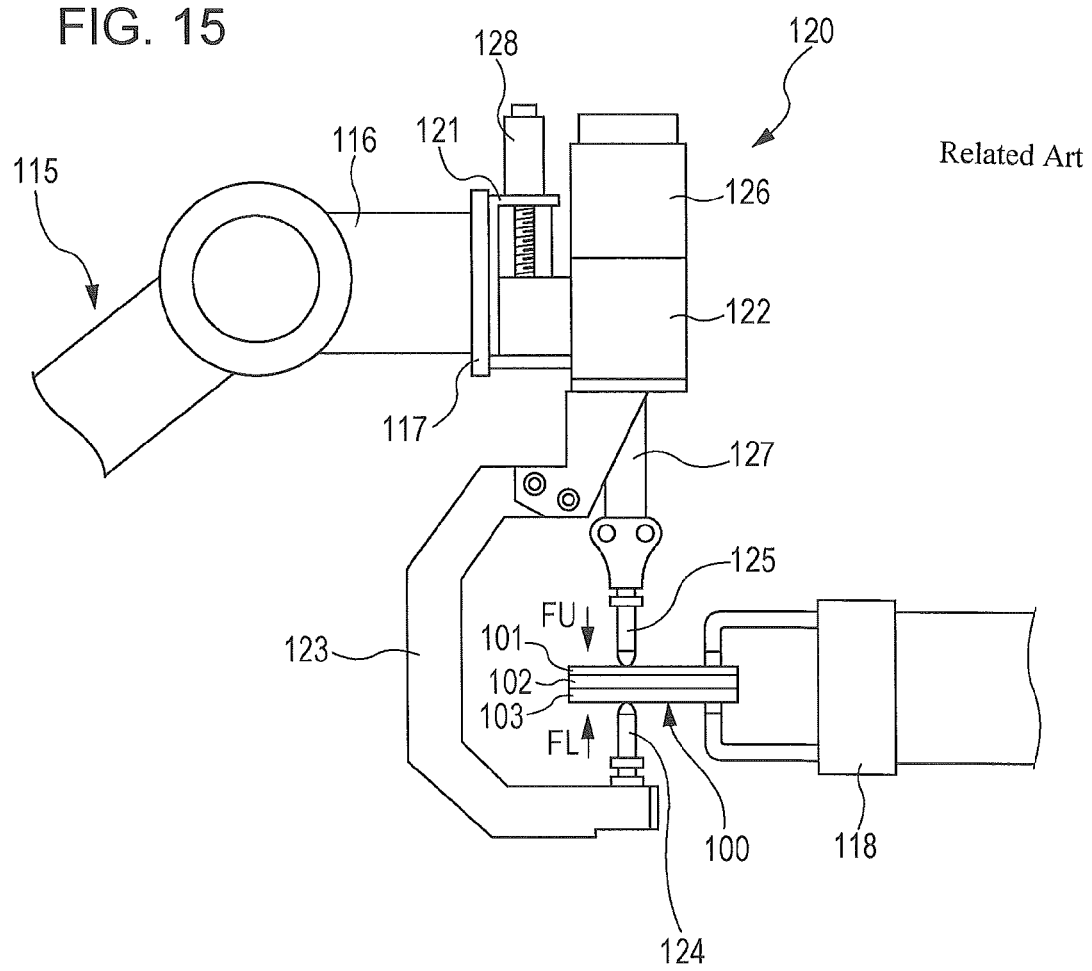
FIG. 15 is a view that briefly illustrates conventional spot welding.

In the above state in which the second welding electrode 35 applies a welding pressure to the second thicker plate 103 while the top end 25a of the first welding electrode 25 and the lower end 13b of the receiving unit 13 are in an abutting relationship with the thinner plate 101 of the workpiece 100, the welding pressure from the second pressure actuator 30 is applied upward from the second welding electrode 35 to the second thicker plate 103 via, for example, the second electrode arm 34. Further, the welding pressure is applied downward from the first welding electrode 25 to the thinner plate 101 via, for example, the base unit 3 and the first electrode arm 24, and is also applied downward from the receiving unit 13 that is adjacent to the first welding electrode 25 to the thinner plate 101 via the fixing arm 10. This operation is schematically illustrated in FIG. 12.

In the above case, the welding pressure of the second pressure actuator 30 acts on the second welding electrode 35 via, for example, the second electrode arm 34, as well as on the first welding electrode 25 via, for example, the base unit 3 and the first electrode arm 24, and on the receiving unit 13 via the fixing arm 10. Here, the welding pressure FL applied to the second thicker plate 103 by the second welding electrode 35 is equal to the total of the welding pressure FU and the welding pressure Fα that are applied to the thinner plate 101 by the first welding electrode 25 and the receiving unit 13, respectively (FL=FU+Fα).

In the above manner, the workpiece 100 is clamped stably by the welding pressure FL that is applied upward to the second thicker plate 103 side by the second welding electrode 35, and the welding pressure FU and the welding pressure Fα that are applied downward to the thinner plate 101 side by the first welding electrode 25 and the receiving unit 13, respectively.

In the welding zone of the workpiece 100, the welding pressure FL is applied to the second thicker plate 103 by the second welding electrode 35, and the welding pressure FU is applied to the thinner plate 101 by the first welding electrode 25 that is of a quantity obtained by subtracting the welding pressure Fα by the receiving unit 13 from the welding pressure FL by the second welding electrode 35 (FU=FL−Fα).

As described above, the welding pressure FU of the first welding electrode 25 that is positioned on the thinner plate 101 side is controlled to be smaller than the welding pressure FL of the second welding electrode 35 that is positioned on the second thicker plate 103 side (FU<FL). As a result, the contact pressure at the joint between the thinner plate 101 and the first thicker plate 102 becomes smaller than the contact pressure at the joint between the first thicker plate 102 and the second thicker plate 103. Thus, the contact resistance between the thinner plate 101 and the first thicker plate 102 is relatively increased, and the contact resistance between the first thicker plate 102 and the second thicker plate 103 is relatively decreased.

Next, the first welding electrode 25 and the second welding electrode 35 are energized for a predetermined time by the welding transformer 40 to perform spot welding in the state in which the workpiece 100 is clamped under pressure by the second welding electrode 35 and a combination of the first welding electrode 25 and the receiving unit 13 in a manner such that the welding pressure FU of the first welding electrode 25 that is positioned on the thinner plate 101 side is smaller than the welding pressure FL of the second welding electrode 35 that is positioned on the second thicker plate 103 side. When the first welding electrode 25 and the second welding electrode 35 are being energized, the contact resistance and the current density at the joint between the thinner plate 101 and the first thicker plate 102 are relatively increased while the contact resistance between the first thicker plate 102 and the second thicker plate 103 is maintained low. As a result, the amount of heat generated at the joint between the thinner plate 101 and the first thicker plate 102 is relatively increased to the amount of heat generated at the joint between the first thicker plate 102 and the second thicker plate 103. Thus, a current flows with a uniform current density from the thinner plate 101 to the second thicker plate 103, and a satisfactory nugget is formed in a region ranging from the thinner plate 101 to the second thicker plate 103, thereby ensuring high weld strength of the thinner plate 101.

After the completion of the welding, the second pressure actuator 30 is operated so as to move the second welding electrode 35 from the second pressing position to the retracted position whereby the workpiece 100 is released from being clamped by the second welding electrode 35 and a combination of the first welding electrode 25 and the receiving unit 13.

Next, the welding robot is operated so as to retract the spot welding apparatus 1 from the welding site on the workpiece 100 and to move the spot welding apparatus 1 to a next welding site on the workpiece 100.

According to the embodiment described above, the spot welding apparatus 1 is configured to be capable of spot welding the workpiece 100 that is a three-ply plate in which the thinner plate 101 of low rigidity and the first thicker plate 102 and the second thicker plate 103 having a higher rigidity than the thinner plate 101 are stacked on top of one another. The spot welding apparatus 1 includes the receiving unit 13 that is attached to the base unit 3 via the fixing arm 10; the first welding electrode 25 that can be moved among the retracted position, the first pressing position and the second pressing position by the first pressure actuator 20; and the second welding electrode 35 that can be moved among the retracted position, the second pressing position and the first pressing position by the second pressure actuator 30. The spot welding apparatus 1 is configured such that the workpiece 100 is clamped between a combination of the second welding electrode 35 at the first pressing position and the receiving unit 13, and the first welding electrode 25 at the first pressing position that opposes the second welding electrode 35, with the result that the welding pressure FL and the welding pressure Fα are applied to the thinner plate 101 by the second welding electrode 35 and the receiving unit 13, respectively, and the welding pressure FU is applied to the second thicker plate 103 by the first welding electrode 25. In this manner, the contact pressure at the joint between the thinner plate 101 and the first thicker plate 102 is controlled to be smaller than the contact pressure at the joint between the first thicker plate 102 and the second thicker plate 103. As a result, when the first welding electrode 25 and the second welding electrode 35 are energized, the current density at the joint between the thinner plate 101 and the first thicker plate 102 is relatively increased to the current density at the joint between the first thicker plate 102 and the second thicker plate 103. Thus, a satisfactory nugget is formed in an extensive region ranging from the thinner plate 101 to the second thicker plate 103 with uniform penetration, thereby ensuring high weld strength of the thinner plate 101. The spot welding apparatus 1 is also configured to perform spot welding in a manner such that the workpiece 100 is clamped between a combination of the first welding electrode 25 at the second pressing position and the receiving unit 13, and the second welding electrode 35 at the second pressing position, with the result that the welding pressure FU and the welding pressure Fα are applied to the thinner plate 101 by the first welding electrode 25 and the receiving unit 13, respectively, and the welding pressure FL is applied to the second thicker plate 103 by the second welding electrode 35. In this manner, the contact pressure at the joint between the thinner plate 101 and the first thicker plate 102 is controlled to be smaller than the contact pressure at the joint between the first thicker plate 102 and the second thicker plate 103. As a result, when the first welding electrode 25 and the second welding electrode 35 are energized, a satisfactory nugget is formed in an extensive region ranging from the thinner plate 101 to the second thicker plate 103 with uniform penetration, thereby ensuring high weld strength of the thinner plate 101. Thus, stable weld quality can be achieved. According to this configuration, the spot welding apparatus 1 can continuously spot weld workpieces 100 having the thinner plate 101, the first thicker plate 102 and the second thicker plate 103 in different arrangements without the need of greatly changing the posture of the welding apparatus 1. For example, a three-ply workpiece 100 in which a thinner plate 101, a first thicker plate 102 and a second thicker plate 103 are sequentially stacked from the bottom, and a three-ply workpiece 100 in which a thinner plate 101, a first thicker plate 102 and a second thicker plate 103 are sequentially stacked from the top can be spot welded continuously without greatly changing the posture of the welding apparatus 1.

The scope of the present invention is not limited to the embodiment described above, and various modifications can occur insofar as they are within the spirit of the invention. For example, the servomotors 21 and 31 used for the first pressure actuator 20 and the second pressure actuator 30 may be replaced by air cylinders. The direct driving units 22 and 32 may be constituted by a gear mechanism or the like instead of the ball screw mechanism adopted in the above embodiment.

Further, although the receiving unit 13 has been described as having a pipe shape with the upper end 13a and the lower end 13b, the shape may be changed to various shapes such as a semi-broken pipe shape or a semi-circular convex shape curved outward from the support section 12 of the fixing arm 10 in accordance with the shape or other conditions of the workpiece 100.

The workpiece 100 is not limited to a three-ply plate and may contain four or more plates as long as thicker plates and thinner plate(s) having different rigidities are stacked on top of one another.

What is claimed is:

1. A spot welding apparatus for spot welding a workpiece in which a thinner plate, and a first thicker plate and a second thicker plate that have a higher rigidity than the thinner plate are sequentially stacked on top of one another, the apparatus comprising:
 a base unit;
 a first welding electrode and a second welding electrode that are supported by the base unit and are movable toward and away from each other in an opposing relationship; and
 a receiving unit supported by a fixing arm which is arranged between the first welding electrode and the second welding electrode on the base unit, the receiving unit including an upper end and a lower end for clamping the workpiece,
 wherein a central axis of the receiving unit is attached so as to be in a coaxial relationship with the first welding electrode and the second welding electrode,
 wherein, in a case where the thinner plate is nearest the second welding electrode, the workpiece is clamped between a combination of the second welding electrode that abuts against the thinner plate and the upper end of the receiving unit that is adjacent to the second welding electrode and abuts against the thinner plate, and the first welding electrode that abuts against the second thicker plate, a pressure is applied to the workpiece only by the first welding electrode simultaneously with the clamping by the second welding electrode and the upper end of the receiving unit, and a current is passed between the first welding electrode and the second welding electrode while the workpiece is clamped under pressure to spot weld the workpiece, and wherein, in a case where the thinner plate is nearest the first welding electrode, the workpiece is clamped between a combination of the first welding electrode that abuts against the thinner plate and the lower end of the receiving unit that is adjacent to the first welding electrode and abuts against the thinner plate, and the second welding electrode that abuts against the second thicker plate, a pressure is applied to the workpiece only by the second welding electrode simultaneously with the clamping by the first welding electrode and the lower end of the receiving unit, and a current is passed between the first welding electrode and the second welding electrode while the workpiece is clamped under pressure to spot weld the workpiece.

2. A spot welding apparatus for spot welding a workpiece in which a thinner plate, and a first thicker plate and a second thicker plate having a higher rigidity than the thinner plate are sequentially stacked on top of one another, the apparatus comprising:

a base unit;

a first welding electrode that is movable to any one of a retracted position, a first pressing position and a second pressing position by a first pressure actuator supported by the base unit;

a second welding electrode that is movable to any one of a retracted position, a first pressing position and a second pressing position in an opposing relationship with the first welding electrode by a second pressure actuator supported by the base unit; and a receiving unit supported by a fixing arm which is arranged between the first welding electrode and the second welding electrode on the base unit, the receiving unit including an upper end and a lower end for clamping the workpiece, wherein a central axis of the receiving unit is attached so as to be in a coaxial relationship with the first welding electrode and the second welding electrode, wherein, in a case where the thinner plate is nearest the second welding electrode, the workpiece is clamped between a combination of the second welding electrode that is positioned at the first pressing position and the upper end of the receiving unit that is adjacent to the second welding electrode and abuts against the thinner plate, and the first welding electrode that is positioned at the first pressing position, a pressure is applied to the workpiece only by the first welding electrode simultaneously with the clamping by the second welding electrode and the upper end of the receiving unit, and a current is passed between the first welding electrode and the second welding electrode while the workpiece is clamped under pressure to spot weld the workpiece, and wherein, in a case where the thinner plate is nearest the first welding electrode, the workpiece is clamped between a combination of the first welding electrode that is positioned at the second pressing position and the lower end of the receiving unit that is adjacent to the first welding electrode and abuts against the thinner plate, and the second welding electrode that is positioned at the second pressing position, a pressure is applied to the workpiece only by the second welding electrode simultaneously with the clamping by the second welding electrode and the lower end of the receiving unit, and a current is passed between the first welding electrode and the second welding electrode while the workpiece is clamped under pressure to spot weld the workpiece.

3. The spot welding apparatus according to claim 1, wherein, in the case where the thinner plate is nearest the second welding electrode, a distal end surface of the second welding electrode and a distal end surface of the receiving unit are co-planar such that they simultaneously contact the thinner plate.

4. The spot welding apparatus according to claim 1, wherein, in the case where the thinner plate is nearest the first welding electrode, a distal end surface of the first welding electrode and a distal end surface of the receiving unit are co-planar such that they simultaneously contact the thinner plate.

5. The spot welding apparatus according to claim 1, wherein, in the case where the thinner plate is nearest the second welding electrode, a pressure applied by the first welding electrode to the second thicker plate is substantially equal to a sum of a pressure applied by the second welding electrode and a pressure applied by the receiving unit on the thinner plate.

6. The spot welding apparatus according to claim 1, wherein, in the case where the thinner plate is nearest the first welding electrode, a pressure applied by the second welding electrode to the second thicker plate is substantially equal to a sum of a pressure applied by the first welding electrode and a pressure applied by the receiving unit on the thinner plate.

7. The spot welding apparatus according to claim 2, wherein, in the case where the thinner plate is nearest the second welding electrode, a distal end surface of the second welding electrode and a distal end surface of the receiving unit are co-planar such that they simultaneously contact the thinner plate.

8. The spot welding apparatus according to claim 2, wherein, in the case where the thinner plate is nearest the first welding electrode, a distal end surface of the first welding electrode and a distal end surface of the receiving unit are co-planar such that they simultaneously contact the thinner plate.

9. The spot welding apparatus according to claim 2, wherein, in the case where the thinner plate is nearest the second welding electrode, a pressure applied by the first welding electrode to the second thicker plate is substantially equal to a sum of a pressure applied by the second welding electrode and a pressure applied by the receiving unit on the thinner plate.

10. The spot welding apparatus according to claim 2, wherein, in the case where the thinner plate is nearest the first welding electrode, a pressure applied by the second welding electrode to the second thicker plate is substantially equal to a sum of a pressure applied by the first welding electrode and a pressure applied by the receiving unit on the thinner plate.

* * * * *